United States Patent
Yamada et al.

(10) Patent No.: US 8,001,324 B2
(45) Date of Patent: Aug. 16, 2011

(54) INFORMATION PROCESSING APPARATUS AND INFORMAITON PROCESSING METHOD

(75) Inventors: Masahiro Yamada, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 12/153,253

(22) Filed: May 15, 2008

(65) Prior Publication Data

US 2009/0240911 A1    Sep. 24, 2009

(30) Foreign Application Priority Data

Mar. 21, 2008    (JP) .................................. 2008-073781

(51) Int. Cl.
*G06F 12/00*    (2006.01)
(52) U.S. Cl. ........................................ 711/114; 711/171
(58) Field of Classification Search .................. 711/114, 711/171
See application file for complete search history.

(56) References Cited

U.S. PATENT DOCUMENTS

| | | | |
|---|---|---|---|
| 2004/0225662 A1 | 11/2004 | Nojima | |
| 2005/0216665 A1* | 9/2005 | Takakuwa | 711/114 |
| 2008/0040539 A1* | 2/2008 | Haustein et al. | 711/113 |

FOREIGN PATENT DOCUMENTS

JP    2004-334561    5/2003

* cited by examiner

*Primary Examiner* — Hashem Farrokh
(74) *Attorney, Agent, or Firm* — Volpe and Koenig, P.C.

(57) ABSTRACT

An information processing apparatus and an information processing method capable of assigning, to an application, a volume having a performance required by the application while simplifying administration are proposed. A performance and a capacity of each first storage area respectively provided by each storage device as well as a performance and a capacity required for a volume respectively assigned to each application running on a host system are managed, and based on the performance and the capacity of each first storage area and the performance and the capacity required for the volume to be respectively assigned to each application, the volume having the performance and the capacity required by the application is assigned to the application, and when a plurality of the volumes are assigned to one of the applications, the volumes provided in the same storage device are preferentially assigned.

8 Claims, 21 Drawing Sheets

FIG.4

APPLICATION DATA PROFILE DEFINITION LIST (ADD)

| AP type | Data type | REQUIRED PERFORMANCE RATE (NUMBER OF IOS/sec/MB) | REQUIRED CACHE RATE (%) |
|---|---|---|---|
| DBMS | Data | 300 | 10 |
| DBMS | Log | 50 | 0 |
| Mail | Index | 400 | 12 |
| Mail | MailBox | 300 | 10 |
| Mail | Log | 50 | 0 |
| 50A | 50B | 50C | 50D |

APPLICATION DATA LIST (ADL)

| AP type | AP ID | Data type | Data ID | CAPACITY |
|---|---|---|---|---|
| DBMS | Finance | Data | FD1 | 300 |
| DBMS | Finance | Log | FL1 | 50 |
| DBMS | Customer | Data | CD1 | 500 |
| DBMS | Customer | Data | CD2 | 500 |
| DBMS | Customer | Data | CD3 | 500 |
| DBMS | Customer | Log | CL1 | 80 |
| DBMS | Item | Data | ID1 | 500 |
| DBMS | Item | Log | IL1 | 80 |
| Mail | Mail | Index | MI1 | 120 |
| Mail | Mail | MailBox | Section1 | 950 |
| Mail | Mail | MailBox | Section2 | 500 |
| Mail | Mail | MailBox | Section3 | 750 |
| Mail | Mail | Log | ML1 | 50 |
| 51A | 51B | 51C | 51D | 51E |

STORAGE POOL TYPE DEFINITION LIST (SPD)

| Storage type | Pool type | EXISTING PERFORMANCE | VOLUME UNIT CAPACITY |
|---|---|---|---|
| MANUFACTURER: X/MODEL: A | RAID1A | 5000 | 512Byte |
| MANUFACTURER: X/MODEL: A | RAID5B | 2000 | 4KByte |
| MANUFACTURER: X/MODEL: B | RAID5D | 1000 | |
| MANUFACTURER: Y/MODEL: C | RAID5E | 500 | |

STORAGE CACHE DEFINITION LIST (STD)

| Storage type | CACHE ASSIGNABLE TOTAL AMOUNT | CACHE ASSIGNABLE UNIT |
|---|---|---|
| MANUFACTURER: X/MODEL: A | 40GB | 16KB |
| MANUFACTURER: X/MODEL: B | 4GB | 4KB |
| MANUFACTURER: Y/MODEL: C | 100GB | 1MB |

STORAGE POOL LIST (SPL)

| Storage type | Storage ID | Pool type | Pool ID | REMAINING CAPACITY | REMAINING PERFORMANCE | EXISTING CAPACITY | EXISTING PERFORMANCE |
|---|---|---|---|---|---|---|---|
| MANUFACTURER: X/MODEL: A | St1 | RAID1A | Pool1 | 1300 | 1300 | 4000 | 7000 |
| MANUFACTURER: X/MODEL: A | St1 | RAID1A | Pool2 | 2000 | 400 | 8000 | 5000 |
| MANUFACTURER: X/MODEL: A | St1 | RAID5C | Pool3 | 1700 | 800 | 16000 | 4000 |
| MANUFACTURER: X/MODEL: B | St2 | RAID5D | Pool4 | 500 | 300 | 5000 | 1200 |
| 54A | 54B | 54C | 54D | 54E | 54F | 54G | 54H |

STORAGE CACHE LIST (SCL)

| Storage ID | Cache ID | Capacity | AP type | Data type | REMAINING CAPACITY |
|---|---|---|---|---|---|
| St1 | C1 | 1300 | DBMS | Data | 300 |
| St1 | C2 | 1300 | Mail | MailBox | 500 |
| St1 | C3 | 800 | Mail | Index | 700 |
| St2 | C4 | 300 | | | |
| St2 | C5 | 0 | | | |
| 55A | 55B | 55C | 55D | 55E | 55F |

Figure 10:
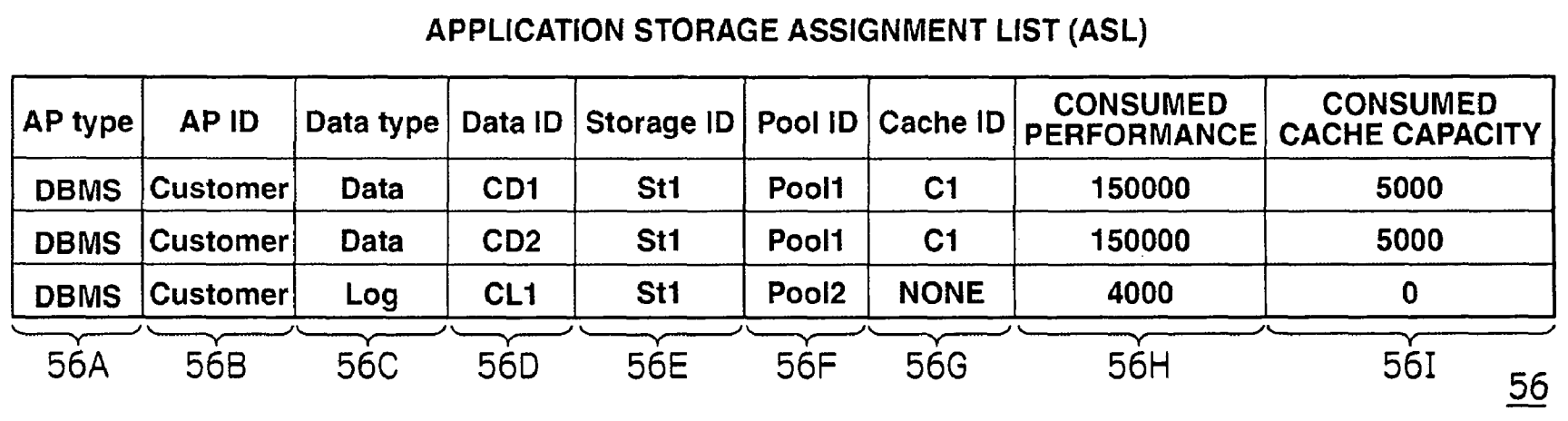

APPLICATION STORAGE ASSIGNMENT LIST (ASL)

| AP type | AP ID | Data type | Data ID | Storage ID | Pool ID | Cache ID | CONSUMED PERFORMANCE | CONSUMED CACHE CAPACITY |
|---|---|---|---|---|---|---|---|---|
| DBMS | Customer | Data | CD1 | St1 | Pool1 | C1 | 150000 | 5000 |
| DBMS | Customer | Data | CD2 | St1 | Pool1 | C1 | 150000 | 5000 |
| DBMS | Customer | Log | CL1 | St1 | Pool2 | NONE | 4000 | 0 |
| 56A | 56B | 56C | 56D | 56E | 56F | 56G | 56H | 56I |

CANDIDATE STORAGE POOL LIST (CSL)

| Storage type | Storage ID | Pool type | Pool ID | REMAINING CAPACITY | REMAINING PERFORMANCE |
|---|---|---|---|---|---|
| MANUFACTURER: X/MODEL: A | St1 | RAID1A | Pool1 | 1300 | 1300 |
| MANUFACTURER: X/MODEL: A | St1 | RAID1A | Pool2 | 2000 | 400 |
| MANUFACTURER: X/MODEL: A | St1 | RAID5C | Pool3 | 1700 | 800 |
| MANUFACTURER: X/MODEL: B | St2 | RAID5D | Pool4 | 500 | 300 |

MIGRATION DATA LIST (MDL)

| AP type | AP ID | Data type | Data ID | CAPACITY | REQUIRED PERFORMANCE | REQUIRED CACHE CAPACITY | Storage ID | Pool ID | Cache ID | POSITION BEFORE MIGRATION | POSITION AFTER MIGRATION |
|---|---|---|---|---|---|---|---|---|---|---|---|
| DBMS | Item | Data | ID1 | 500 | | | | | | | |
| DBMS | Item | Log | IL1 | 80 | | | | | | | |

58A 58B 58C 58D 58E 58F 58G 58H 58I 58J 58K 58L

58

INFORMATION PROCESSING APPARATUS AND INFORMAITON PROCESSING METHOD

CROSS-REFERENCES TO RELATED APPLICATIONS

This application relates to and claims priority from Japanese Patent Application No. 2008-073781, filed on Mar. 21, 2008, the entire disclosure of which is incorporated herein by reference.

BACKGROUND

1. Field of the Invention

The present invention relates to an information processing apparatus and an information processing method, and is preferably applied to, for example, a management server that manages an application server and a storage device in a storage system.

2. Description of Related Art

The popularization of e-commerce and an increase in the use of multimedia data have lead to a rapid increase in the amount of data handled by businesses. In such an environment, techniques related to SANs (Storage Area Networks) that are capable of effectively handling large amounts of data are becoming widespread.

Although the introduction of a SAN increases the flexibility of a corporate information system, the introduction of the SAN also complicates the configuration of storage devices as well as configuration of the devices to be performed by a system administrator. In addition, with the centralization of storage device management, not only does the amount of data to be handled by a single system administrator increase, but the number of types of application server OSs and business applications also increases. Furthermore, the ever-increasing amount of data requires that operations for augmenting storage devices and assigning storage to application servers be frequently performed.

Conventionally, a method for simplifying the assignment of storages to application servers has been proposed in which a volume to be assigned to each application is selected based on the requirement characteristic of each application and the volume characteristic of each volume (refer to Japanese Patent Laid-Open No. 2004-334561). This method is advantageous in that an appropriate volume having a performance required by an application can be assigned to the application.

SUMMARY

However, according to the method disclosed in Japanese Patent Laid-Open No. 2004-334561 described above, for example, there is a risk that volumes in a plurality of storage devices will be assigned to a single application program (hereinafter simply referred to as an application) and that data to be used by the application (hereinafter referred to as application data) will be stored distributed across a plurality of storage devices.

In the event of such an occurrence, a problem arises in that an increase in the number of management object storage devices with respect to a single application makes unified management impossible and complicates administration. Furthermore, such an occurrence requires that a plurality of storage devices is simultaneously switched to a usable state in order to execute a single application, and a problem arises in that the suspension of storage devices due to maintenance will affect a large number of applications.

The present invention has been made in consideration of the above, and an object thereof is to propose an information processing apparatus and an information processing method capable of assigning, to an application, a volume having a performance required by the application while simplifying administration.

In order to achieve the object described above, according to the present invention, an information processing apparatus assigns, to applications running on a host system connected to a plurality of storage devices via network, a volume provided on first storage areas provided by the storage devices as a storage destination of data used by the applications, the information processing apparatus comprising: a management unit that manages a performance and a capacity of each first storage area respectively provided by each storage device as well as a performance and a capacity required for the volume respectively assigned to each application; and an assignment unit that assigns to the application, based on the performance and the capacity of each first storage area and the performance and the capacity required for the volume to be respectively assigned to each application, a volume having the performance and the capacity required by the application, wherein the assignment unit preferentially assigns, when a plurality of volumes are assigned to one of the applications, volumes provided in the same storage device.

Consequently, according to the information processing apparatus, since data to be used by an application is stored consolidated in a minimum number of storage devices, an increase in the complexity of administration can be effectively prevented. In addition, even when storage devices are suspended due to maintenance, the number of affected applications can be reduced.

In addition, according to the present invention, an information processing method assigns, to applications running on a host system connected to a plurality of storage devices via network, a volume provided on first storage areas provided by the storage devices as a storage destination of data used by the applications, the information processing method comprising: a first step for managing a performance and a capacity of each first storage area respectively provided by each storage device as well as a performance and a capacity required for the volume respectively assigned to each application; and a second step for assigning to the application, based on the performance and the capacity of each first storage area and the performance and the capacity required for the volume to be respectively assigned to each application, a volume having the performance and the capacity required by the application, wherein in the second step, when a plurality of volumes are assigned to one of the applications, volumes provided in the same storage device are preferentially assigned.

Consequently, according to the information processing method, since data to be used by an application is stored consolidated in a minimum number of storage devices, an increase in the complexity of administration can be effectively prevented. In addition, even when storage devices are suspended due to maintenance, the number of affected applications can be reduced.

According to the present invention, a volume having a required performance and capacity can be assigned to an application while administration is simplified.

Other aspects and advantages of the invention will be apparent from the following description and the appended claims.

BRIEF DESCRIPTION OF THE DRAWINGS

FIG. 4 is a table showing an application data profile definition list;

FIG. 5 is a table showing an application data list;

FIG. 6 is a table showing a storage pool type definition list;

FIG. 7 is a table showing a storage cache definition list;

FIG. 8 is a table showing a storage pool list;

FIG. 9 is a table showing a storage cache list;

FIG. 10 is a table showing an application storage assignment list;

FIG. 11 is a table showing a candidate storage pool list;

FIG. 12 is a table showing a migration data list;

DETAILED DESCRIPTION OF PREFERRED EMBODIMENTS

A detailed description of an embodiment of the present invention will now be given with reference to the drawings.

(1) Configuration of a Storage System According to the Present Embodiment

Figure 1:
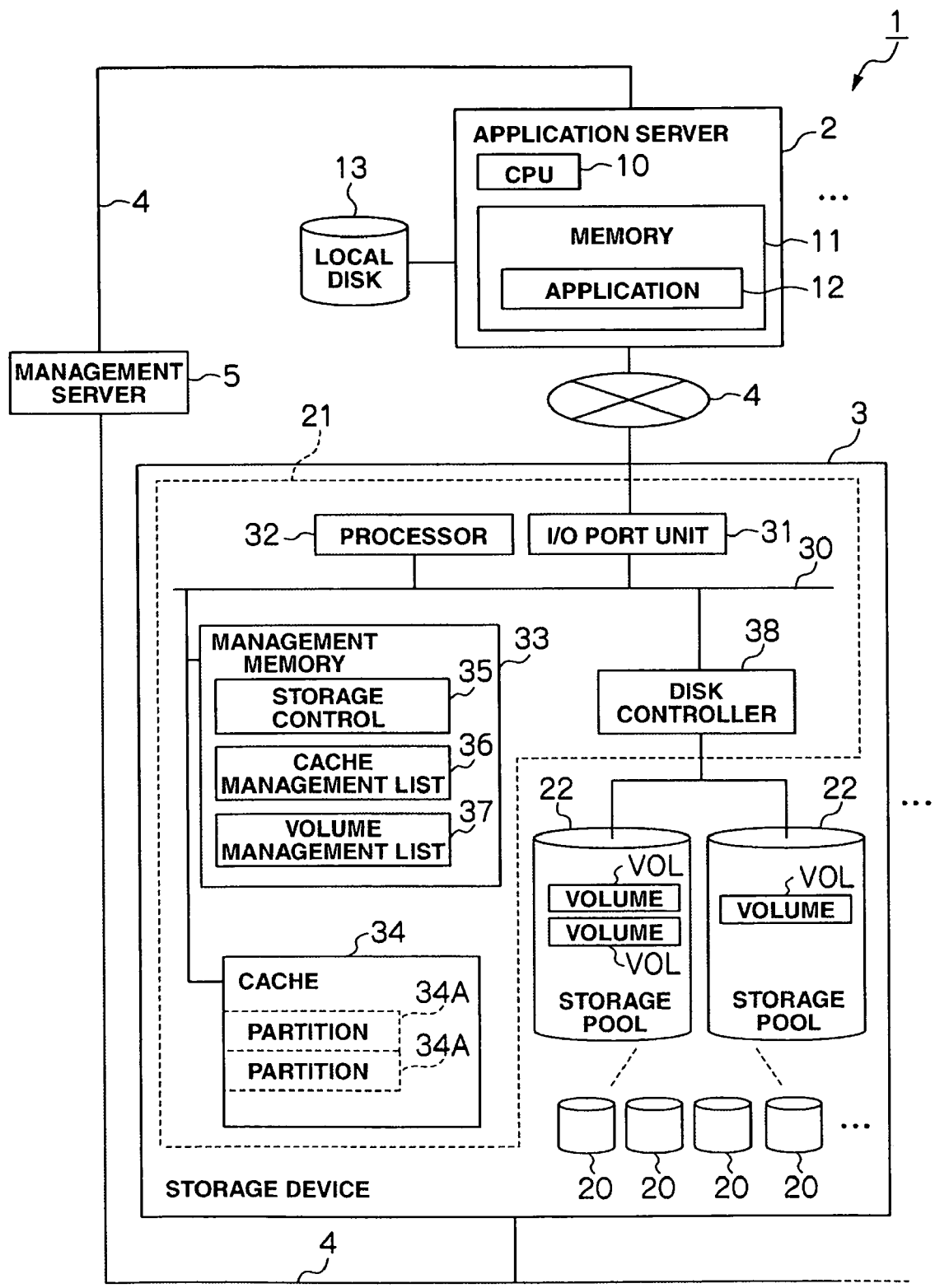
FIG. 1 is a block diagram showing an overall configuration of a storage system according to a preferred embodiment.

In FIG. 1, reference numeral 1 denotes, as a whole, a storage system according to the present embodiment. The storage system 1 is configured such that a application server 2 as a host system and a plurality of storage devices 3 that provide storage areas to the host system are connected via a first network 4 such as a SAN (Storage Area Network) and that a management server 5 is connected to the application server 2 and each storage device 3 via a second network 4 such as a LAN (Local Area Network).

The application server 2 is a computer device that executes user applications and comprises information processing resources such as a CPU (Central Processing Unit) 10 and a memory 11. Running on the application server 2 is an application program (hereinafter simply referred to as an "application") 12 to be used by a user application. Application data to be used by the application 12 is stored in a local disk 13.

The storage device 3 comprises a plurality of physical disks 20 that provides the application server 2 with storage areas for storing data and a control unit 21 that controls input/output of data to/from the physical disks 20.

Disks applicable as the physical disks 20 include expensive disks such as a SCSI (Small Computer System Interface) disk as well as inexpensive disks such as an SATA (Serial AT Attachment) disk or an optical disk. A semiconductor memory such as a flash memory may be applied instead of the physical disks 20.

Each physical disk 20 is operated under RAID by the control unit 21. A single RAID (Redundant Array of Inexpensive Disks) group is defined by a plurality of physical disks 20 and an aggregate of physical storage areas respectively provided by each physical disk 20 constituting the same RAID group is defined as a single storage pool 22. Furthermore, one or more logical volumes VOLs are provided on the storage pool 22.

The control unit 21 comprises an input/output port unit 31, a processor 32, a management memory 33, a cache memory 34 and a disk controller 38 interconnected via an internal bus 30.

The input/output port 31 is an interface for sending/receiving data to/from the application server 2 and includes communication ports (not shown). The communication ports are assigned port addresses such as an IP (Internet Protocol) address or a WWN (World Wide Name) in order to identify each communication port on the SAN 4.

The processor 32 controls operations of the storage device 3 according to various control programs stored in the management memory 33. The management memory 33 comprises a semiconductor memory and, for example, stores various control programs such as a storage control program 35 that functions to control data input/output processing corresponding to a data input/output request from the application server 2. In addition, the cache memory 34 is primarily used to temporarily store data to be inputted/outputted to/from the logical volume VOL.

The disk controller 38 controls a corresponding physical disk 20 in response to a read/write request from the application server 2 and reads/writes the requested data from/to the physical disk 20 corresponding to the logical volume VOL.

In the case of the present embodiment, the storage control program 35 stored in the management memory 33 of the storage device 3 is also provided with functions to logically divide the cache memory 34 into a plurality of partitions (hereinafter, each of these partitions shall be respectively referred to as a "cache partition 34A") and to assign each divided cache partition 34A to any of the logical volumes VOL as a dedicated cache area of the logical volume VOL.

Therefore, with the storage device 3, when a data input/output request is issued from the application server 2, input/output of data to/from a corresponding logical volume VOL is performed using a cache partition 34A assigned to the logical volume VOL among the cache memory 34.

The management memory 33 of the storage device 3 also stores a cache management list 36 storing configuration information of the cache partitions 34A as well as a volume management list 37 that retains information regarding correspondence between the cache partitions 34A and the logical volumes VOL and information regarding volume pools.

Figure 2:
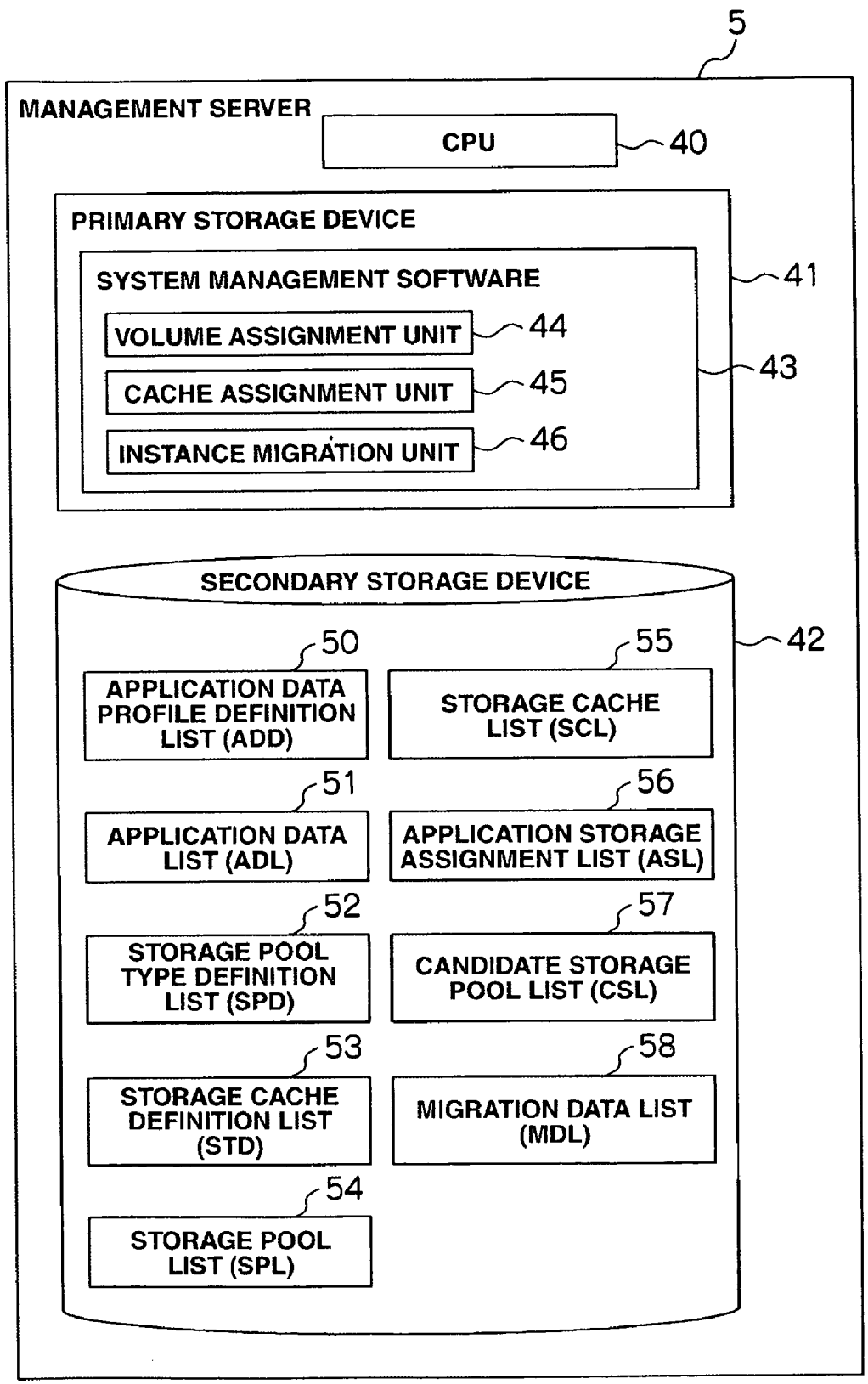
FIG. 2 is a block diagram showing a specific configuration of a management server.

The management server 5 is a server for managing the application server 2 and the respective storage devices 3 and comprises, for example, a personal computer or a work station. As shown in FIG. 2, the management server 5 includes information processing resources such as a CPU 40, a primary storage device 41 and a secondary storage device 42.

The primary storage device 41 comprises, for example, a volatile or non-volatile semiconductor memory, and is used to store control programs such as system management software 43 to be described later. In addition, the secondary storage device 42 comprises, for example, a hard disk drive, and stores control data such as various lists 50 to 58 to be used by the system management software 43.

(2) Volume Assignment Function Provided on the Management Server (2-1) Configuration of Various Lists Next, a volume assignment function provided on the management server 5 will be described.

Figure 3:
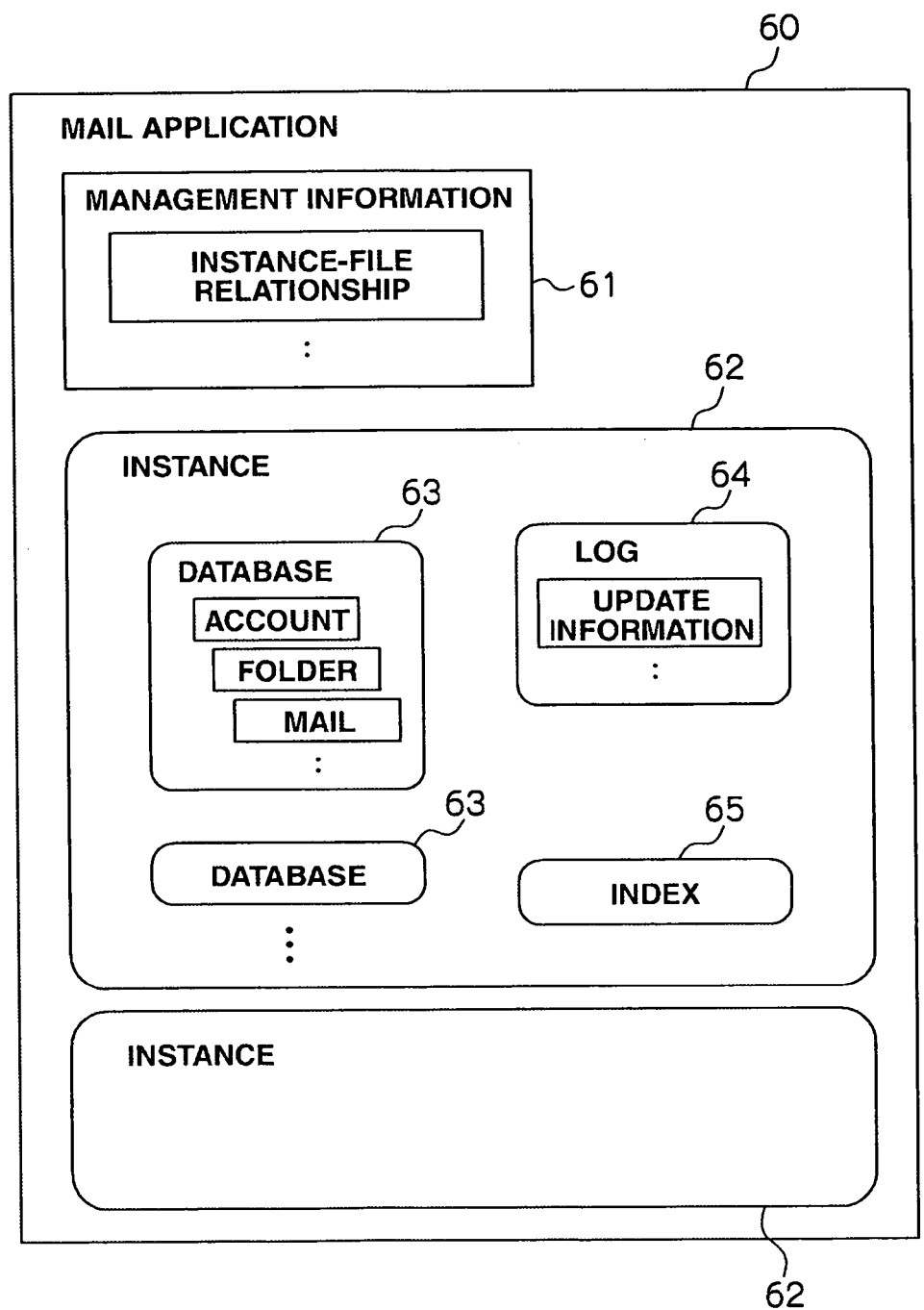
FIG. 3 is a block diagram for describing a configuration of an application.

As shown in FIG. 3, normally, an application comprises one or more instances 62 and management information 61 for managing the instances. In this case, an "instance" refers to application data in user application units.

For example, as shown in FIG. 3, in the case of a mail application 60, a single instance 62 comprises one or more databases 63, a transaction log (hereinafter simply referred to as a "log") 64 and an index 65. Each set of information of the respective databases 63, the log 64 and the index 65 are respectively stored and retained in separate logical volumes VOL as application data of the mail application 60.

Separately storing the respective sets of application data (data of the respective databases 63, data of the log 64 and data of the index 65) of the application structured as described above in a plurality of storage devices 3 disadvantageously complicates the administration of such data.

In consideration thereof, a feature of the storage system 1 according to the present embodiment is that logical volumes VOL within the same storage device 3 are preferentially assigned when a plurality of logical volumes VOL for storing application data to be used by an application running on the application server 2 are assigned to the application such as when application data of the application is migrated from the local disks 13 to the storage devices 3.

As means for implementing the above, the primary storage device 41 (FIG. 2) of the management server 5 stores the system management software 43 provided with a function for migrating application data of an application running on the application server 2 from a local disk 13 to an appropriate storage pool 22 in an appropriate storage device 3.

The system management software 43 comprises: a volume assignment unit 44 provided with a function for assigning a logical volume VOL to each set of application data respectively constituting each instance of an application; a cache assignment unit 45 provided with a function for assigning a cache partition 34A in the storage device 3 to each instance of the application; and an instance migration unit 46 provided with a function for migrating an instance of the application from the local disk 13 to the storage device 3.

In addition, the secondary storage device 42 of the management server 5 stores an application data profile definition list (ADD) 50, an application data list (ADL) 51, a storage pool type definition list (SPD) 52, a storage cache definition list (STD) 53, a storage pool list (SPL) 54, a storage cache list (SCL) 55, an application storage assignment list (ASL) 56, a candidate storage pool list (CSL) 57 and a migration data list (MDL) 58 which the system management software 43 uses when controlling migration of the application data.

The application data profile definition list (ADD) 50 is a list that defines profiles according to type of each set of application data constituting an instance of an application provided on the application server 2 and, as shown in FIG. 4, comprises an application type field 50A, a data type field 50B, a required performance rate field 50C and a required cache rate field 50D.

The application type field 50A and the data type field 50B respectively store a type of each application provided on the application server 2 and a type of application data to be used by the application. Types of applications include "database management service (DBMS)" and "Mail". Types of application data include "Data" and "Log" with respect to the "database management service" and "Index", "Mail box" and "log" with respect to "mail".

The required performance rate field 50C stores a performance rate (in this case, the number of data input/outputs performable per unit capacity and per unit time) required for the logical volume VOL that stores the application data, while the required cache rate field 50D stores a capacity required for the cache partition 34A (FIG. 1) to be assigned to the logical volume VOL.

The application data profile definition list (ADD) 50 is created and provided in advance by the manufacturer of the system management software 43 (FIG. 2). Addition of entries to the application data profile definition list (ADD) 50 or changes to contents thereof is performed by the user by referring to a manual of the application or the like. Furthermore, the application data profile definition list (ADD) 50 can be deleted by a user operation when judged unnecessary by the user.

The application data list (ADL) 51 is a table for managing correspondence between instances of each application provided on the application server 2 and application data constituting the instances and, as shown in FIG. 5, comprises an application type field 51A, an application ID field 51B, a data type field 51C, a data ID field 51D and a capacity field 51E.

Among these fields, the data type field 51C stores types of corresponding application data and the data ID field 51D stores IDs assigned to the application data (hereinafter referred to as "data IDs"). In addition, the application ID field 51B stores IDs (hereinafter referred to as "application IDs") assigned to instances constituted by the application data and the application type field 51A stores types of applications using the instance. Furthermore, the capacity field 51E stores capacities of the application data.

The application data list (ADL) 51 is created upon activation of the system management software 43 of the management server 5 by the system management software 43 by collecting application configuration information from the application server 2. The collection method employed at this point differs according to object applications. For example, in the case of MS-Exchange, an API (Application Program Interface) provided by MS-Exchange acquires configuration information of MS-Exchange data files. In addition, in the case of Apache Web Server, configuration information of related files/directories is acquired from a configuration definition file.

The storage pool type definition list (SPD) 52 is a list that defines respective performance characteristics of storage pools 22 (FIG. 1) configured on each storage device 3 existing in the storage system 1 and, as shown in FIG. 6, comprises a storage type field 52A, a pool type field 52B, an existing performance field 52C and a volume unit capacity field 52D.

The storage type field 52A stores codes such as a manufacturer name or a model which represent a type of the storage device 3 in which a corresponding storage pool 22 has been configured, while the pool type field 52B stores information such as a RAID level and a RAID configuration of the corresponding storage pool 22 and characteristics of the physical disks 30 (FIG. 1) constituting the storage pool 22.

The existing performance field 52C stores a processing performance rate per unit time of the entire corresponding storage pool 22. The definition of the processing performance rate is the same as the definition of the required performance rate stored in the required performance rate field 50C in the application data profile definition list (ADD) 50, described above with reference to FIG. 4.

The volume unit capacity field 52D stores a minimum unit when a logical volume VOL is assigned in the storage pool 22. Therefore, when a logical volume VOL is configured in the storage pool 22, the capacity of the logical volume VOL is assigned so as to be a multiple of the minimum unit stored in the volume unit capacity field 52D.

The storage pool type definition list (SPD) 52 is created and provided in advance by the manufacturer of the system management software 43. Addition of entries to the storage pool type definition list (SPD) 52 or changes to contents thereof is performed by the user by referring to a manual of the application or the like. Furthermore, the storage pool type definition list (SPD) 52 can be deleted by a user operation when judged unnecessary by the user.

Meanwhile, the storage cache definition list (STD) 53 is a list used by the system management software 43 for managing a capacity of a cache memory 34 (FIG. 1) of each storage device 3 existing in the storage system 1, and, as shown in FIG. 7, comprises a storage type field 53A, a cache assignable total amount field 53B and a cache assignment unit field 53C.

The storage type field 53A stores codes such as a manufacturer name or a model which represent a type of the corresponding storage device 3, while the cache assignable total amount field 53B stores a capacity assignable to a cache partition 34A newly created in the storage device 3. In addition, the cache assignment unit field 53C stores a capacity unit used when the cache partition 34A is created in the storage device 3.

The storage cache definition list (STD) 53 is created and provided in advance by the manufacturer of the system management software 43. Addition of entries to the storage cache definition list (STD) 53 or changes to contents thereof is performed by the user by referring to a manual of the application or the like. Furthermore, the storage cache definition list (STD) 53 can be deleted by a user operation when judged unnecessary by the user.

The storage pool list (SPL) 54 is a list used by the system management software 43 for managing storage pools 22 (FIG. 1) configured on each storage device 3 existing in the storage system 1 and, as shown in FIG. 8, comprises a storage type field 54A, a storage ID field 54B, a pool type field 54C, a pool ID field 54D, a remaining capacity field 54E, a remaining performance field 54F, an existing capacity field 54G and an existing performance field 54H.

The storage type field 54A stores codes such as a manufacturer name or a model which represent a type of the storage device 3 on which the corresponding storage pool 22 is configured, while the storage ID field 54B stores an ID assigned to the storage device 3 (hereinafter referred to as a "storage ID").

The pool type field 54C stores information representing the type of the corresponding storage pool 22 such as a RAID level or RAID configuration of the storage pool 22 and characteristics of physical disks 30 (FIG. 1) constituting the storage pool 22, while the pool ID field 54D stores an ID assigned to the corresponding storage pool 22 (hereinafter referred to as a "pool ID").

The existing capacity field 54G stores a total capacity of the storage pool 22, while the existing performance field 54H stores a processing performance rate per unit time of the storage pool 22.

Furthermore, the remaining capacity field 54E stores a remaining capacity of the corresponding storage pool 22. The remaining capacity is a value obtained by subtracting a capacity already assigned to logical volumes VOL from the total existing capacity of the storage pool 22. The remaining performance field 54F stores a remaining performance of the storage pool 22. The remaining performance is a value obtained by subtracting the performance consumed (the number of data input/outputs performable within a unit capacity and a unit time with respect to a logical volume VOL; hereinafter referred to as "consumed performance") by each logical volume VOL configured on the storage pool 22 from the total existing performance rate of the storage pool 22.

The storage pool list (SPL) 54 is created upon activation of the system management software 43 of the management server 5 by the system management software 43 by collecting storage configuration information from each storage device 3. The collection method employed differs according to the object storage device 3. For example, an interface standardized under SMI-S can be used.

The storage cache list (SCL) 55 is a list for managing each cache partition 34A (FIG. 1) defined in each storage device 3 in the storage system 1, and, as shown in FIG. 9, comprises a storage ID field 55A, a cache ID field 55B, a capacity field 55C, an application type field 55D, a data type field 55E and a remaining capacity field 55F.

The storage ID field 55A stores a storage ID of a storage device 3 on which a corresponding cache partition 34A is created, while the cache ID field 55B stores an ID assigned to a cache memory 34 (hereinafter referred to as a "cache ID") on which the cache partition 34A is created.

The capacity field 55C stores the capacity of the cache memory 34, while the application type field 55D stores types of applications that use the corresponding cache partition 34A. The data type field 55E stores types of application data stored in a logical volume VOL associated with the cache partition 34A, while the remaining capacity field 55F stores the remaining capacity of the cache memory 34 on which the cache partition 34A is defined. The remaining capacity is a value obtained by subtracting the capacities of all cache partitions 34A defined on the cache memory 34 from the total capacity of the cache memory 34.

The storage cache list 55 is created upon activation of the system management software 43 of the management server 5 by the system management software 43 by collecting storage configuration information from each storage device 3.

The application storage assignment list (ASL) 56 is a list for managing assigned statuses of application data to the storage devices 3 such as which storage pool 22 of which storage device 3 stores application data of an application running on the application server 2, and with which cache partition 34A the logical volume VOL storing the application data is associated. As shown in FIG. 10, the application storage assignment list (ASL) 56 comprises an application type field 56A, an application ID field 56B, a data type field 56C, a data ID field 56D, a storage ID field 56E, a pool ID field 56F, a cache ID field 56G, a consumed performance field 56H and a consumed cache capacity field 56I.

The application type field 56A stores types of applications that use the corresponding application data, while the application ID field 56B stores an application ID of an instance constituted by the application data. The data type field 56C stores types of corresponding application data and the data ID field 56D stores data IDs of the application data.

The storage ID field 56E and the pool ID field 56F respectively store storage IDs of storage devices 3 storing corresponding application data and pool IDs of storage pools 22 storing the application data, while the cache ID field 56G stores cache IDs of cache partitions 34A assigned to the logical volumes VOL storing the application data.

The consumed performance field 56H stores a performance consumed by writing/reading corresponding application data (hereinafter referred to as a "consumed performance"). A consumed performance is calculated by multiplying the capacity of application data stored in the capacity field 51E of a corresponding entry in the application data list (ADL) 51 described above with reference to FIG. 5 by a required performance rate stored in the required performance rate field 50C of a corresponding entry in the application data profile definition list (ADD) 50 described above with reference to FIG. 4.

The consumed cache capacity field 56I stores a capacity of a corresponding cache partition 34A consumed by writing/reading corresponding application data (hereinafter referred to as a "consumed cache capacity"). A consumed cache capacity is calculated by multiplying the capacity of application data stored in the capacity field 51E of a corresponding entry in the application data list (ADL) 51 described above with reference to FIG. 5 by a required cache rate stored in the required cache rate field 50D of a corresponding entry in the application data profile definition list (ADD) 50 described above with reference to FIG. 4.

The application storage assignment list (ASL) 56 is created upon activation of the system management software 43 of the management server 5 by the system management software 43 by collecting configuration information of application data from the application server 2 and by collecting storage configuration information from each storage device 3.

The candidate storage pool list (CSL) 57 is a list for managing storage pools 22 (FIG. 1) which become migration destination candidates when application data is migrated to the storage device 3 and, as shown in FIG. 11, comprises a storage type field 57A, a storage ID field 57B, a pool type field 57C, a pool ID field 57D, a remaining capacity field 57E and a remaining performance field 57F.

The storage type field 57A, the storage ID field 57B, the pool type field 57C, the pool ID field 57D, the remaining capacity field 57E and the remaining performance field 57F respectively store the same information as the storage type field 54A, the storage ID field 54B, the pool type field 54C, the pool ID field 54D, the remaining capacity field 54E and the remaining performance field 54F of the storage pool list (SPL) 54 described above with reference to FIG. 8.

The candidate storage pool list 57 is temporarily created when application data is migrated to the storage device 3 as described later and information regarding all storage pools 22 is registered therein. Information on all entries is deleted upon completion of migration processing of all application and upon reacquisition of configuration information of the respective storage devices 3.

The migration data list (MDL) 58 is a list used by the system management software 43 for managing application data of each application specified as a migration object by the user among respective sets of application data retained in the local disk 13 of the application server 2 and, as shown in FIG. 12, comprises an application type field 58A, an application ID field 58B, a data type field 58C, a data ID field 58D, a capacity field 58E, a required performance field 58F, a required cache capacity field 58G, a storage ID field 58H, a pool ID field 58I, a cache ID field 58J, a position before migration field 58K and a position after migration field 58L.

The application type field 58A, the application ID field 58B, the data type field 58C, the data ID field 58D and the capacity field 58E respectively store the same information as the application type field 51A, the application ID field 51B, the data type field 51C, the data ID field 51D and the capacity field 51E of the application data list (ADL) 51 described above with reference to FIG. 5.

The required performance field 58F stores a performance required for the logical volume VOL that stores application data whose data ID is stored in the data ID field 58D (hereinafter referred to as a "required performance"). The required performance is calculated by multiplying the capacity of the logical volume VOL stored in the capacity field 58E of the migration data list (MDL) 58 by the required performance rate of the application data defined in the application data profile definition list (ADD) 50 (FIG. 4).

The required cache capacity field 58G stores a capacity required for the cache partition 34A assigned to the logical volume VOL storing the application data (hereinafter referred to as a "required cache capacity"). The required cache capacity is calculated by multiplying the capacity of the logical volume VOL stored in the capacity field 58E of the migration data list (MDL) 58 by the required cache rate of the application data defined in the application data profile definition list 50.

The storage ID field 58H and the pool ID field 58I respectively store storage IDs of storage devices 3 that are migration destinations of corresponding application data and pool IDs of migration destination storage pools 22, while the cache ID field 58J stores cache IDs of cache partitions 34A assigned to the logical volumes VOL storing the application data.

The position before migration field 58K stores a position (for example, identification information of a local disk 13 or the like) before migration of corresponding application data, while the position after migration field 58L stores identification information of a logical volume VOL (hereinafter referred to as a "volume ID") in which the application data is to be stored after migration.

The migration data list (MDL) 58 is created when application data is migrated to the storage device 3 as described later, and information regarding all migration application data are registered therein. Information of the respective entries of the migration data list (MDL) 58 is deleted upon completion of migration of all migration application data registered in the migration data list (MDL) 58.

(2-2) Processing By the Management Server CPU Regarding the Volume Assignment Function Next, a description will be given on specific contents of processing performed by the CPU 40 of the management server 5 regarding the volume assignment function provided on the management server 5 as described above using, as an example, application data migration processing for migrating application data stored in a local disk 13 of the application server 2 to a storage device 3.

Figure 13:
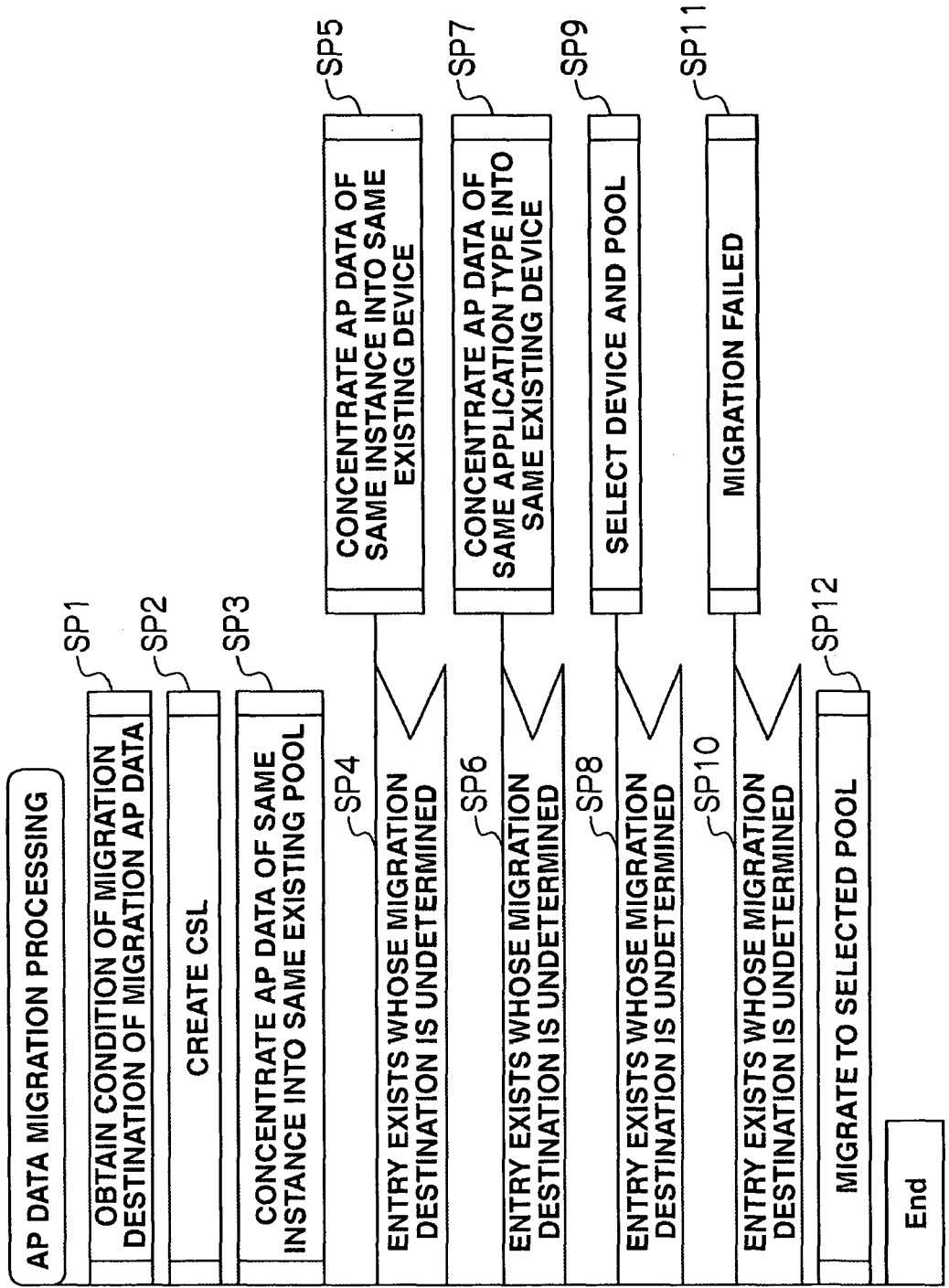
FIG. 13 is a PAD showing contents of processing performed by a CPU of a management server regarding application data migration processing.

FIG. 13 shows specific contents of processing performed by the CPU 40 of the management server 5 regarding the application data migration processing. The CPU 40 executes the application data migration processing shown in FIG. 13 based on an instance migration unit 46 of the system management software 43.

More specifically, when an application is specified and an instruction for migrating application data thereof to the storage device 3 is issued, the CPU 40 starts the application data migration processing shown in FIG. 13. Subsequently, the CPU 40 first registers all migration application data to be used by each of the applications in the migration data list (MDL) 58 (FIG. 12), and calculates the performance required by the logical volume VOL that is the migration destination of the application data and the cache capacity required for the cache partition 34A assigned to the logical volume VOL (SP1).

The CPU 40 then creates a candidate storage pool list (CSL) 57 shown in FIG. 11 in which are registered storage pools 22 that are potential migration destinations of the respective sets of application data registered in the migration data list (MDL) 58 in step SP1 (SP2).

Next, for each set of migration application data, the CPU 40 sequentially judges whether the application data can be migrated to a storage pool 22 storing other application data constituting the same instance. If application data exists for which the judgment yields a positive result, the CPU 40 preferentially determines the storage pool 22 to be the migration destination of the application data (SP3).

The CPU 40 then judges whether there are application data whose migration destination is undetermined even after the processing of step SP3 (SP4). When such application data exists, the CPU 40 sequentially judges whether the application data can be migrated to any of the storage pools 22 in the storage device 3 storing other application data constituting the same instance. If there is application data that can be migrated, the CPU 40 preferentially determines the storage pool 22 to be the migration destination of the application data (SP5).

The CPU 40 next judges whether there are application data whose migration destination is undetermined even after the processing of step SP5 (SP6). When such application data exists, the CPU 40 judges whether the application data can be migrated to any of the storage pools 22 in the storage device 3 storing application data constituting another instance used by the same application. If there is application data that can be migrated, the CPU 40 preferentially determines the storage pool 22 to be the migration destination of the application data (SP7).

The CPU 40 next judges whether there are application data whose migration destination is undetermined even after the processing of step SP7 (SP8). When such application data exists, the CPU 40 judges whether the application data can be migrated to any of the storage pools 22 in any of the storage devices 3. If there is application data that can be migrated, the CPU 40 determines the storage pool 22 to be the migration destination of the application data (SP9).

The CPU 40 next judges whether there are application data whose migration destination is undetermined even after the processing of step SP9 (SP10). When such application data exists, the CPU 40 produces a message to the effect that the application data cannot be migrated (SP11).

Subsequently, with respect to the respective sets of application data for which migration destinations have been determined in step SP3, step SP5, step SP7 or step SP9, the CPU 40 controls the application server 2 and the storage device 3 so as to migrate the application data to the migration destination storage pool 22 determined in step SP3, step SP5, step SP7 or step SP9 (SP12), and then concludes the present application data migration processing.

Figure 14:
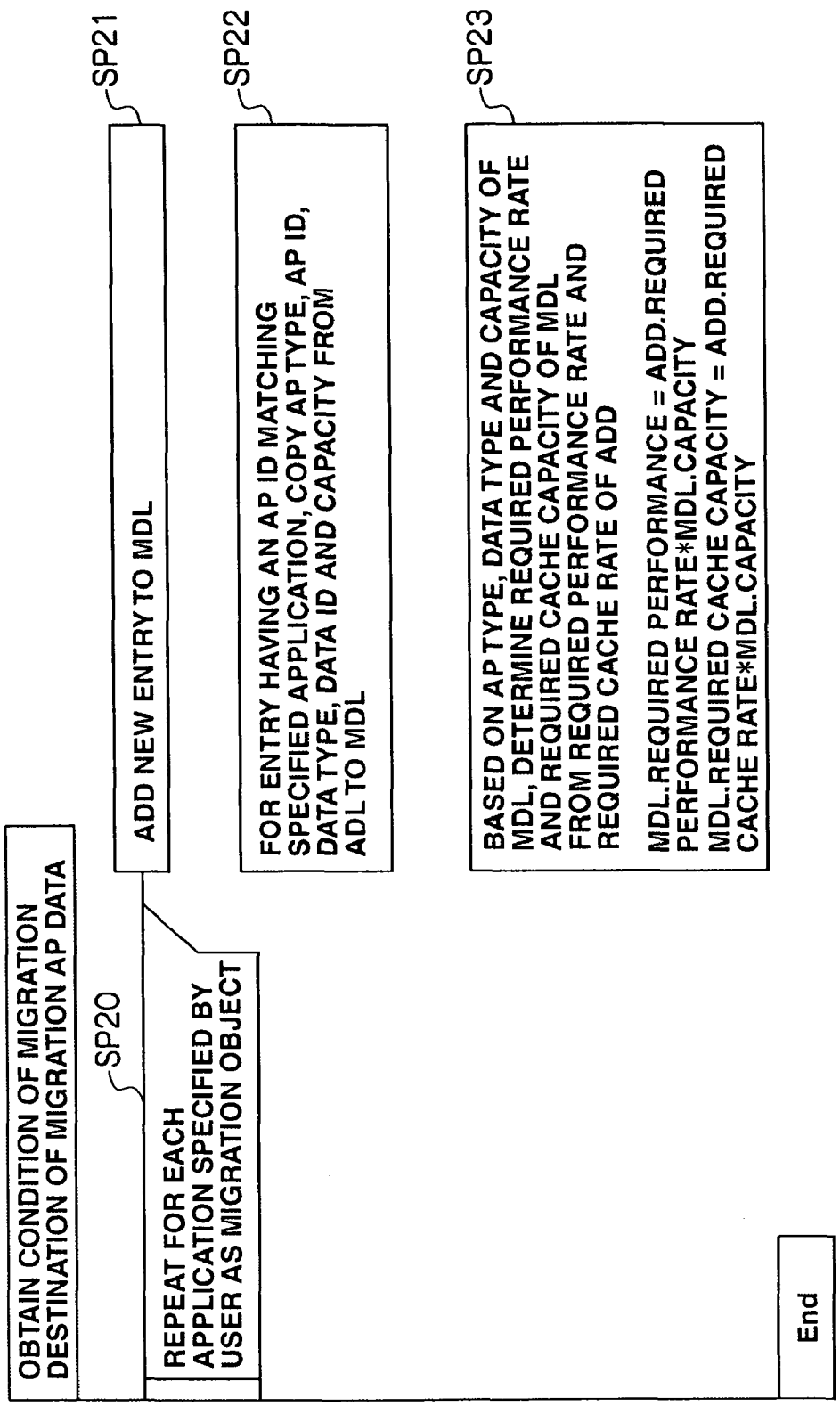
FIG. 14 is a PAD showing specific contents of processing performed by a CPU of a management server regarding step SP1 of application data migration processing.

FIG. 14 shows specific contents of processing performed by the CPU 40 in step SP1 of the application data migration processing described above. When the application data migration processing proceeds to step SP1, the CPU 40 executes the following processing on each application specified by the user as an object of application data migration (SP20).

More specifically, the CPU 40 first adds a new entry to the migration data list (MDL) 58 shown in FIG. 12 (SP21). Then, for entries whose application IDs stored in the application ID field 51B match the application ID of the instance used by the then targeted application among the respective entries of the application data list (ADL) 51 shown in FIG. 5, the CPU 40 respectively copies information stored in the application type field 51A, the application ID field 51B, the data type field 51C, the data ID field 51D and the capacity field 51E to the application type field 58A, the application ID field 58B, the data type field 58C, the data ID field 58D and the capacity field 58E of the migration data list (MDL) 58. Consequently, all application data used by the then targeted application is registered in the migration data list (MDL) 58.

Next, for each entry of application data registered in the migration data list (MDL) 58, the CPU 40 respectively calculates a performance (required performance) required by the logical volume VOL storing corresponding application data and a capacity (required cache capacity) required for the cache partition 34A assigned to the logical volume VOL.

More specifically, the CPU 40 calculates a required performance by multiplying the required performance rate of corresponding application data registered in the application data profile definition list (ADD) 50 shown in FIG. 4 by the capacity stored in the capacity field 58E of the entry of the migration data list (MDL) 58. In addition, the CPU 40 calculates a required cache capacity by multiplying the required cache rate of corresponding application data registered in the application data profile definition list (ADD) 50 by the capacity stored in the capacity field 58E of the entry of the migration data list (MDL) 58.

The CPU 40 then respectively stores the required performance and the required cache capacity calculated as described above in the required performance field 58F and the required cache capacity field 58G of the entry of the migration data list (MDL) 58.

After completing the processing of step SP21 to step SP23 on all applications specified by the user as migration objects, the CPU 40 concludes step SP1 of the application data migration processing.

Figure 15:
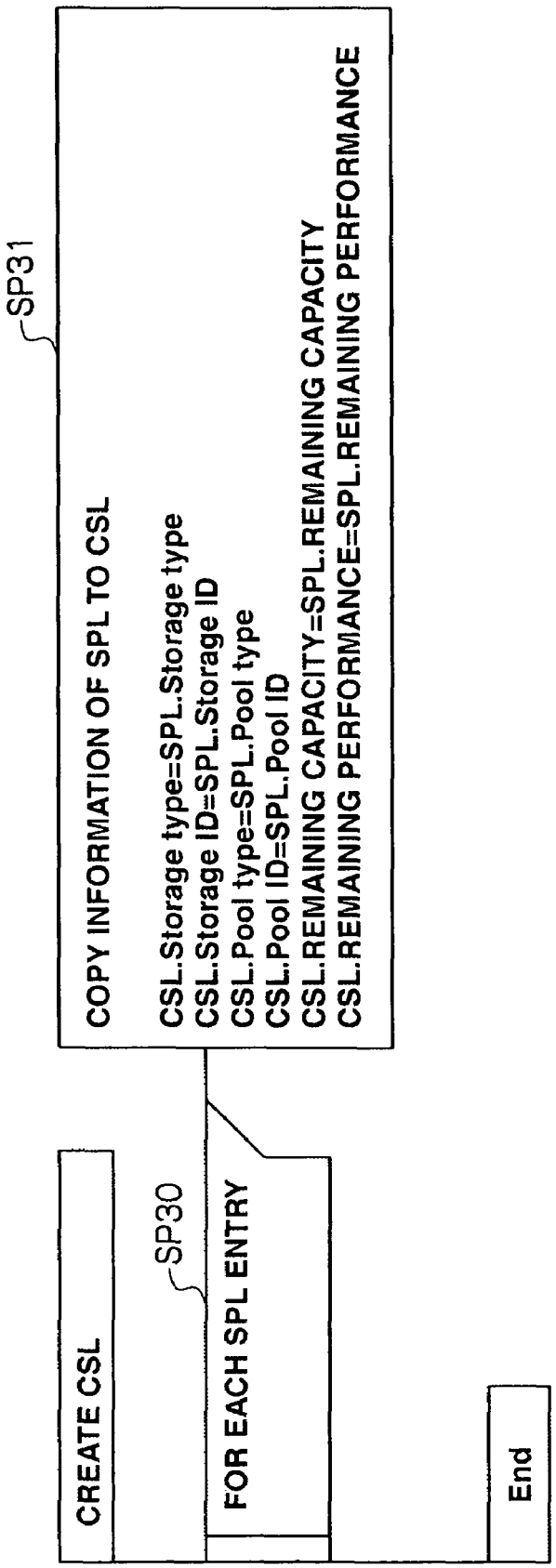
FIG. 15 is a PAD showing specific contents of processing performed by a CPU of a management server in step SP2 of application data migration processing.

FIG. 15 shows specific contents of processing performed by the CPU 40 in step SP2 of the application data migration processing. When the application data migration processing proceeds to step SP2, the CPU 40 executes the following processing on each entry of the storage pool list (SPL) 54 shown in FIG. 8 (SP30).

More specifically, the CPU 40 selects an entry of the storage pool list (SPL) 54, and respectively copies information stored in the storage type field 54A, the storage ID field 54B, the pool type field 54C, the pool ID field 54D, the remaining capacity field 54E and the remaining performance field 54F of the entry to the storage type field 57A, the storage ID field 57B, the pool type field 57C, the pool ID field 57D, the remaining capacity field 57E and the remaining performance field 57F of the entry newly added to the candidate storage pool list (CSL) 57 shown in FIG. 11 (SP31).

Upon completing similar processing on all entries of the storage pool list (SPL) 54, the CPU 40 concludes the processing of step SP2 of the application data migration processing.

Figure 16:
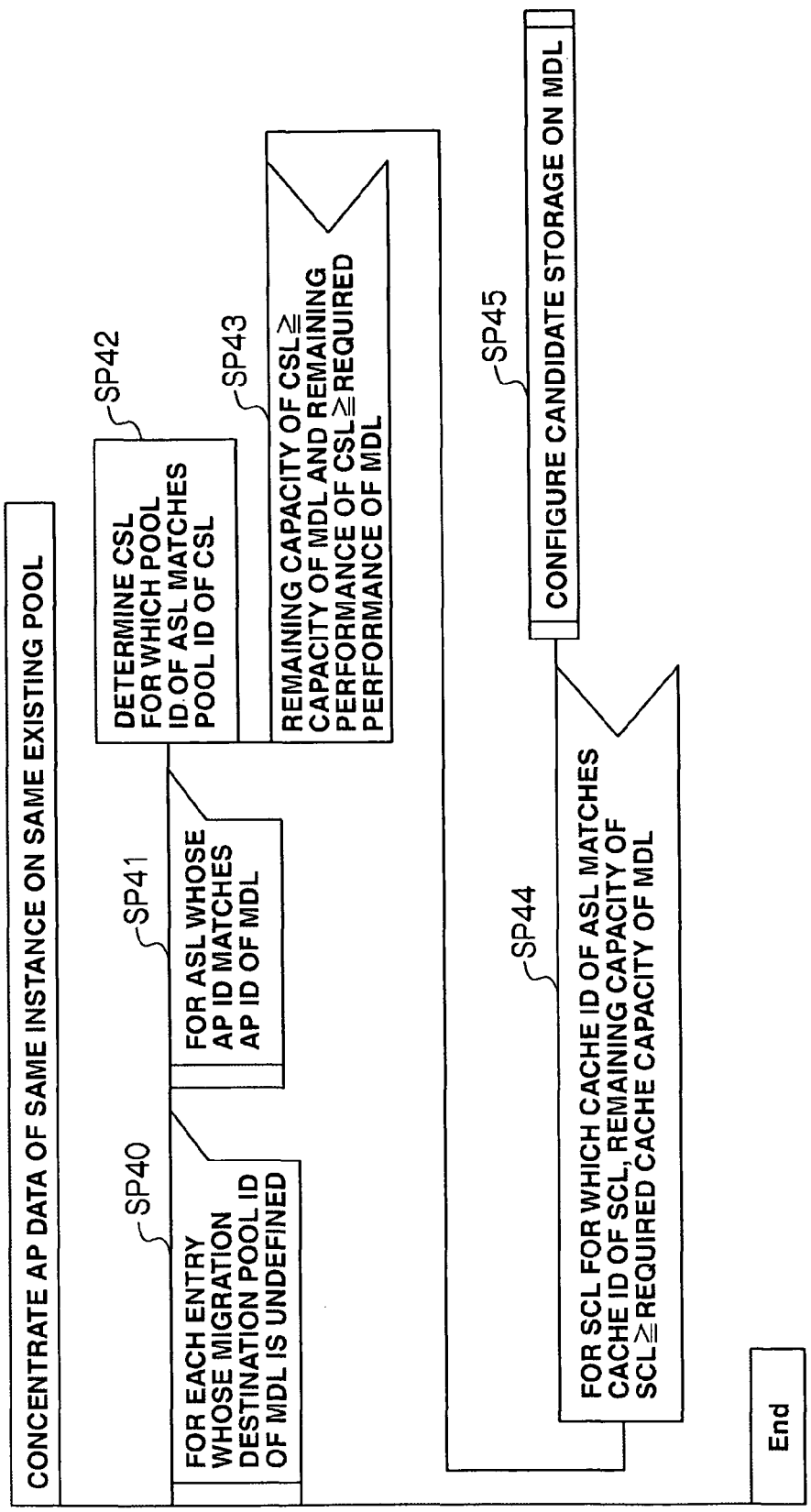
FIG. 16 is a PAD showing specific contents of processing performed by a CPU of a management server in step SP3 of application data migration processing.

Meanwhile, FIG. 16 shows specific contents of processing performed by the CPU 40 in step SP3 of the application data migration processing.

When the application data migration processing proceeds to step SP3, the CPU 40 executes the following processing on each entry for which a pool ID of the migration destination storage pool 22 is not stored in the pool ID field 581 on the migration data list (MDL) 58 shown in FIG. 12 (SP40).

More specifically, among the entries of the application storage assignment list (ASL) 56, the CPU 40 selects an entry for which the same application ID as the application ID stored in the application ID field 58B of a single entry of the migration data list (MDL) 58 is stored in the application ID field 56B (SP41). Consequently, an entry in the application storage assignment list is selected which is also an entry that corresponds to other application data constituting the same instance as the application data corresponding to the then targeted entry of the migration data list (MDL) 58.

The CPU 40 then searches for an entry of the candidate storage pool list (CSL) 57 shown in FIG. 11 for which the same pool ID as the pool ID of the entry selected in step SP41 which is stored in the pool ID field 56F is stored in the pool ID field 57D (SP42).

A detection of a relevant entry from the candidate storage pool list (CSL) 57 yielded by the search signifies that an entry has been retrieved that corresponds to a storage pool 22 storing other application data constituting the same instance as the then targeted application data (application data corresponding to the then targeted entry of the migration data list (MDL) 58).

Thus, at this point, the CPU 40 judges whether the remaining capacity and the remaining performance of the corresponding storage pool 22 respectively stored in the remaining capacity field 57E and the remaining performance field 57F of the retrieved entry are both equal to or greater than the capacity and the required performance respectively stored in the capacity field 58E and the required performance field 58F of the then targeted entry of the migration data list (MDL) 58 (SP43).

When the judgment yields a positive result, the CPU 40 searches among entries of the storage cache list (SCL) 55 shown in FIG. 9 for an entry for which the same cache ID as the cache ID stored in the cache ID field 56G of the then targeted entry (the entry selected in step SP41) of the application storage assignment list (ASL) 56 is stored in the cache ID field 55B. This entry corresponds to the cache partition 34A assigned to any of the logical volumes VOL configured on the storage pool 22 corresponding to the entry retrieved in step SP42.

When such an entry exists, the CPU 40 judges, with respect to the entry, whether the remaining capacity of the corresponding cache partition 34A (FIG. 1) stored in the remaining capacity field 55F is equal to or greater than the required cache capacity stored in the required cache capacity field 58G of the then targeted entry of the migration data list (MDL) 58 (SP44).

Thus, when the judgment yields a positive result, the CPU 40 sets the migration destination of application data corresponding to the then targeted entry of the migration data list 58 to the storage pool 22 corresponding to the entry of the migration data list (MDL) 58 (SP45).

Upon completing the processing of step SP41 to step SP45 on all entries for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58, the CPU 40 concludes the processing of step SP3 of the application data migration processing.

Figure 17:
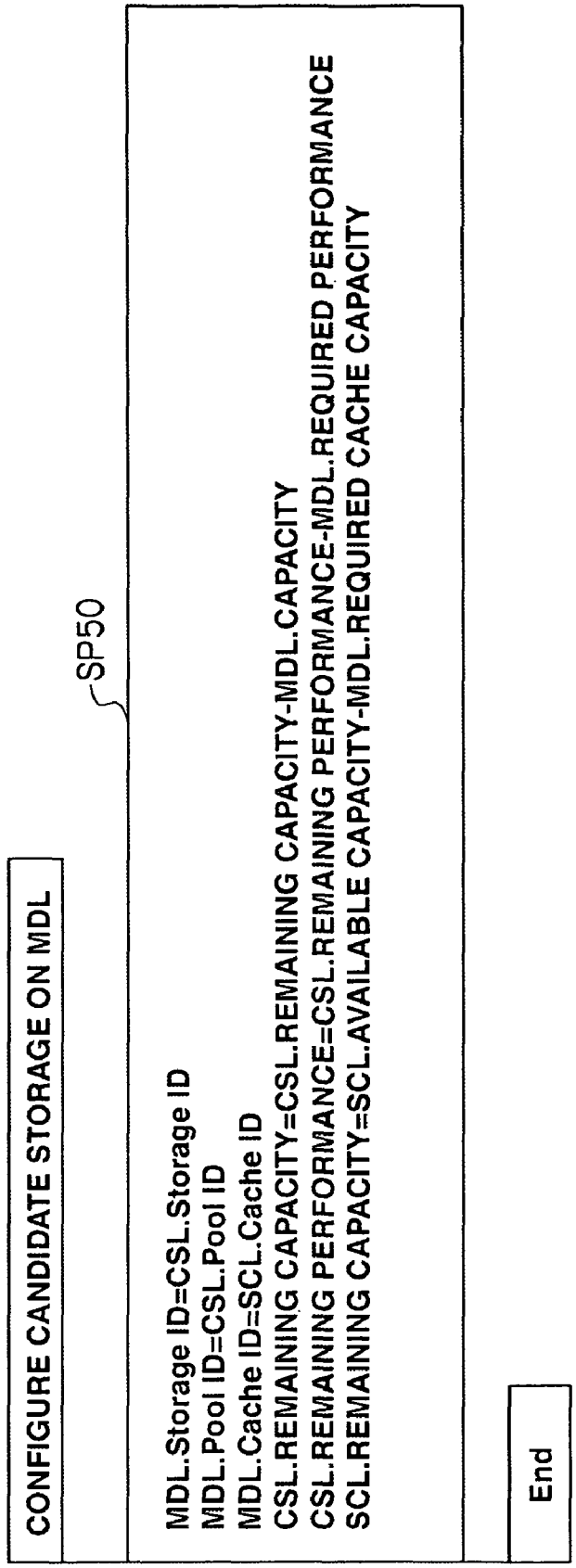
FIG. 17 is a PAD showing specific contents of processing performed by a CPU of a management server when a migration destination candidate is set to the migration data list.

FIG. 17 shows specific contents of processing performed by the CPU 40 in step SP45. The CPU 40 stores the pool ID of the storage pool 22 retrieved in step SP42 in the pool ID field 58I of the then targeted entry of the migration data list (MDL) 58 and stores the storage ID of the storage device 3 on which the storage pool 22 is provided in the storage ID field 58H of the entry. In addition, the CPU 40 stores the cache ID stored in the cache ID field 55B of the entry subjected to the judgment in step SP44 on the storage cache list (SCL) 55 in the cache ID field 58J of the entry.

The CPU 40 also updates the remaining capacity of the corresponding storage pool 22 stored in the remaining capacity field 57E of the corresponding entry of the candidate storage pool list (CSL) 57 to a value obtained by subtracting the capacity stored in the capacity field 58E of the then targeted entry of the migration data list (MDL) 58 from the original remaining capacity. Similarly, the CPU 40 updates the remaining performance of the corresponding storage pool 22 stored in the remaining performance field 57F of the corresponding entry of the candidate storage pool list (CSL) 57 to a value obtained by subtracting the required performance stored in the required performance field 58F of the then targeted entry of the migration data list (MDL) 58 from the original remaining performance. Furthermore, the CPU 40 updates the remaining capacity stored in the remaining capacity field 55F of the then corresponding entry of the storage cache list (SCL) 55 to a value obtained by subtracting the required cache capacity stored in the required cache capacity field 58G of the then targeted entry of the migration data list (MDL) 58 from the original remaining capacity (SP50). The CPU 40 subsequently concludes the present processing.

Figure 18:
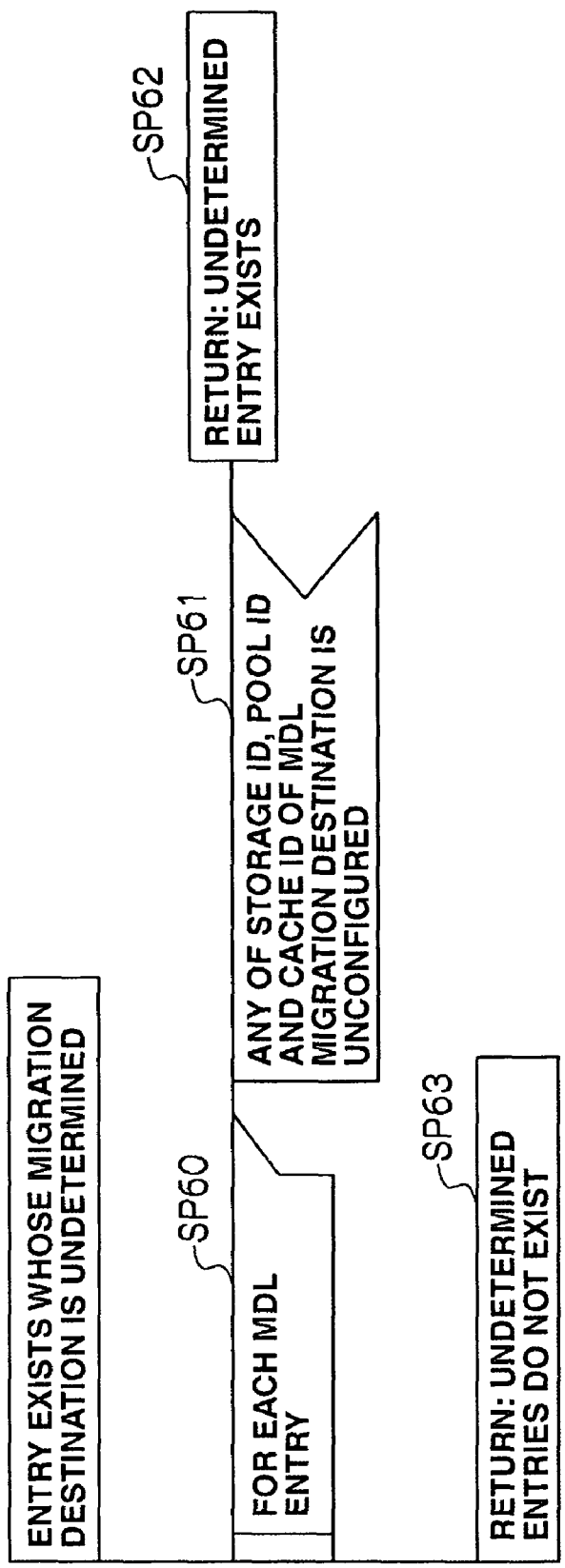
FIG. 18 is a PAD showing specific contents of processing performed by a CPU of a management server regarding judgment of an entry whose migration destination is undetermined.

FIG. 18 shows specific contents of processing performed by the CPU 40 in step SP4, step SP6, step SP8 and step SP10 of the application data migration processing. When the application data migration processing (FIG. 13) proceeds to step SP4, step SP6, step SP8 or step SP10, the CPU 40 executes the following processing on each entry of the migration data list (MDL) 58 (SP60).

More specifically, among the entries of the migration data list (MDL) 58, the CPU 40 judges whether an entry exists for which any of the storage ID field 58H, the pool ID field 58I and the cache ID field 58J is not yet configured (SP61). When the judgment yields a positive result, the CPU 40 judges that "an entry exists whose migration destination has not been configured" and returns to application data migration processing (FIG. 13) (SP62).

In contrast, when the judgment of step SP61 performed on all entries of the migration data list (MDL) 58 does not yield a positive result, the CPU 40 judges that "an entry whose migration destination has not been configured does not exist" and returns to application data migration processing (FIG. 13) (SP63).

Figure 19:
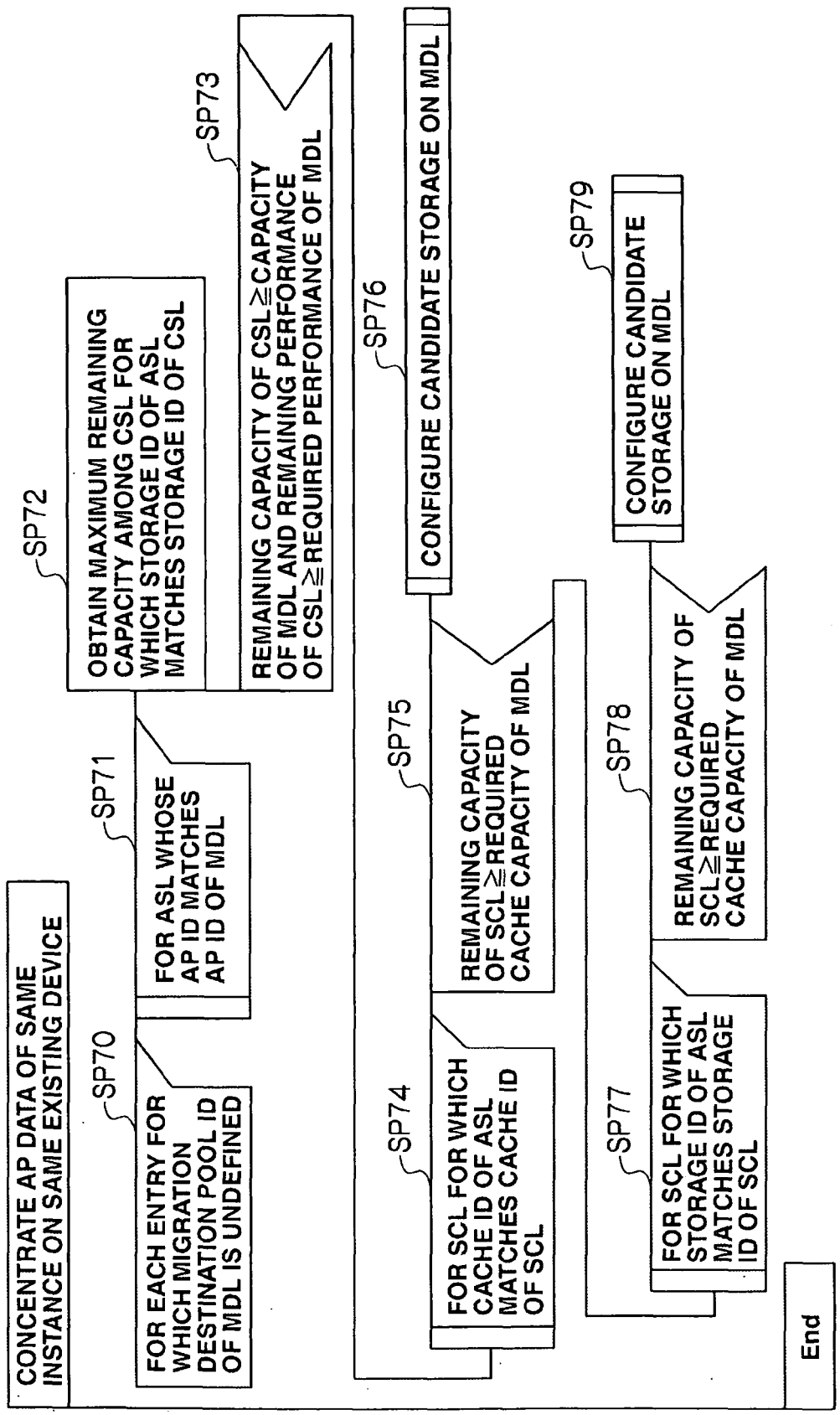
FIG. 19 is a PAD showing specific contents of processing performed by a CPU of a management server in step SP5 of application data migration processing.

Meanwhile, FIG. 19 shows specific contents of processing performed by the CPU 40 in step SP5 of the application data migration processing. When the application data migration processing proceeds to step SP5, the CPU 40 performs the following processing on each entry for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58 (SP70).

More specifically, among the entries of the application storage assignment list (ASL) 56, the CPU 40 selects an entry for which the same application ID as the application ID stored in the application ID field 58B of a single entry of the migration data list (MDL) 58 is stored in the application ID field 56B (SP71). Consequently, an entry in the application storage assignment list 56 is selected which is also an entry that corresponds to other application data constituting the same instance as the application data corresponding to the then targeted entry of the migration data list (MDL) 58.

The CPU 40 then searches among entries of the candidate storage pool list (CSL) 57 for which the same storage ID as the storage ID stored in the storage ID field 56E of the entry is stored in the storage ID field 57B for an entry whose remaining capacity stored in the remaining capacity field 57E is maximum (SP72).

A detection of a relevant entry from the candidate storage pool list (CSL) 57 resulting from the search signifies that an entry has been detected that corresponds to a storage pool 22 whose remaining capacity is maximum among storage devices 3 storing other application data constituting the same instance as the then targeted application data (application data corresponding to the then targeted entry of the migration data list (MDL) 58).

Thus, at this point, the CPU 40 judges whether the remaining capacity and the remaining performance of the corresponding storage pool 22 respectively stored in the remaining capacity field 57E and the remaining performance field 57F of the retrieved entry are both equal to or greater than the capacity and the required performance respectively stored in the capacity field 58E and the remaining performance field 58F of the then targeted entry of the migration data list (MDL) 58 (SP73).

When the judgment yields a positive result, the CPU 40 searches among entries of the storage cache list (SCL) 55 shown in FIG. 9 for an entry for which the same cache ID as the cache ID stored in the cache ID field 56G of the then targeted entry (the entry selected in step SP72) of the application storage assignment list (ASL) 56 is stored in the cache ID field 55B (SP74).

The CPU 40 then judges, with respect to the entry, whether the remaining capacity of the corresponding cache partition 34A stored in the remaining capacity field 55F is equal to or greater than the required cache capacity stored in the required cache capacity field 58G of the then targeted entry of the migration data list (MDL) 58 (SP75).

Thus, when the judgment yields a positive result, in the same manner as in step SP45 shown in FIG. 16, the CPU 40 sets the migration destination of application data corresponding to the then targeted entry of the migration data list 58 to the storage pool 22 corresponding to the entry of the migration data list (MDL) 58 (SP76).

In contrast, when the judgment yields a negative result, the CPU 40 searches among entries of the storage cache list (SCL) 55 for an entry for which the same storage ID as the storage ID stored in the storage ID field 56E of the then targeted entry (the entry selected in step SP71) of the application storage assignment list (ASL) 56 is stored in the storage ID field 55A (SP77).

The CPU 40 then judges, with respect to the entry, whether the remaining capacity of the corresponding cache partition 34A stored in the remaining capacity field 55F is equal to or greater than the required cache capacity stored in the required cache capacity field 58G of the then targeted entry of the migration data list (MDL) 58 (SP78).

Thus, when the judgment yields a positive result, in the same manner as in step SP76, the CPU 40 sets the migration destination of application data corresponding to the then targeted entry of the migration data list 58 to the storage pool 22 corresponding to the entry of the migration data list (MDL) 58 (SP79).

Upon completing the processing of step SP71 to step SP79 on all entries for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58, the CPU 40 concludes the processing of step SP5 of the application data migration processing.

Figure 20:
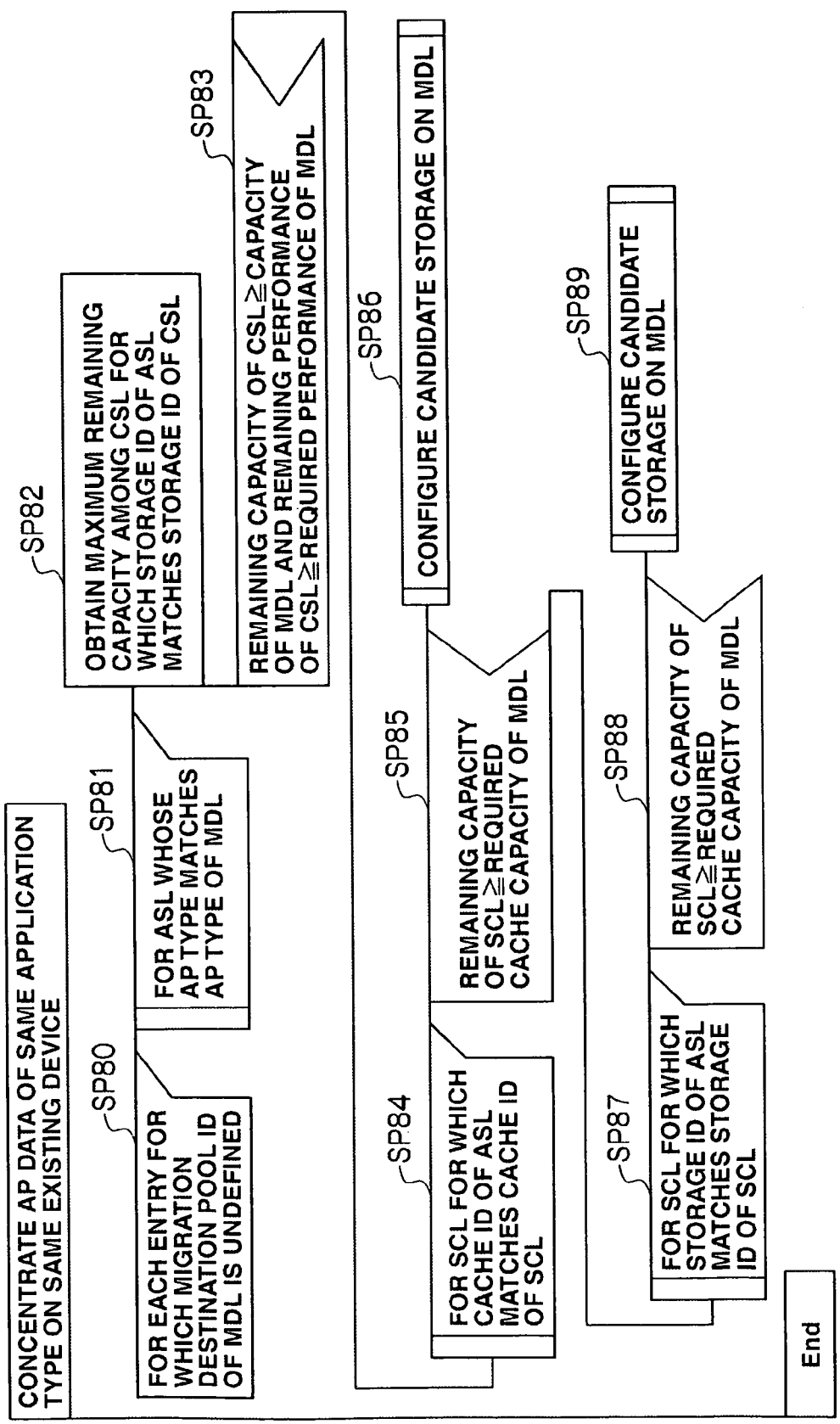
FIG. 20 is a PAD showing specific contents of processing performed by a CPU of a management server in step SP7 of application data migration processing.

FIG. 20 shows specific contents of processing performed by the CPU 40 in step SP7 of the application data migration processing. When the application data migration processing proceeds to step SP7, the CPU 40 performs the following processing on each of the entries for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58 (SP80).

More specifically, among the entries of the application storage assignment list (ASL) 56, the CPU 40 selects an entry for which the same application type as the application type stored in the application type field 58A of a single entry of the migration data list (MDL) 58 is stored in the application type field 56A (SP81).

The CPU 40 subsequently executes the same processing as that of step SP72 to step SP79 described above with reference to FIG. 19 on the entry (SP82 to SP89). Accordingly, with respect to the then targeted migration application data, a judgment is made on whether the application data can be migrated to any of the storage pools 22 in the storage device 3 storing other application data that is used by the same application that uses the migration object application data. When migration is possible, the migration destination of application data corresponding to the then targeted entry of the migration data list 58 is set to the migration data list (MDL) 58 (SP86, SP89).

Upon completing similar processing on each of the entries for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58, the CPU 40 concludes the processing of step SP7 of the application data migration processing.

Figure 21:
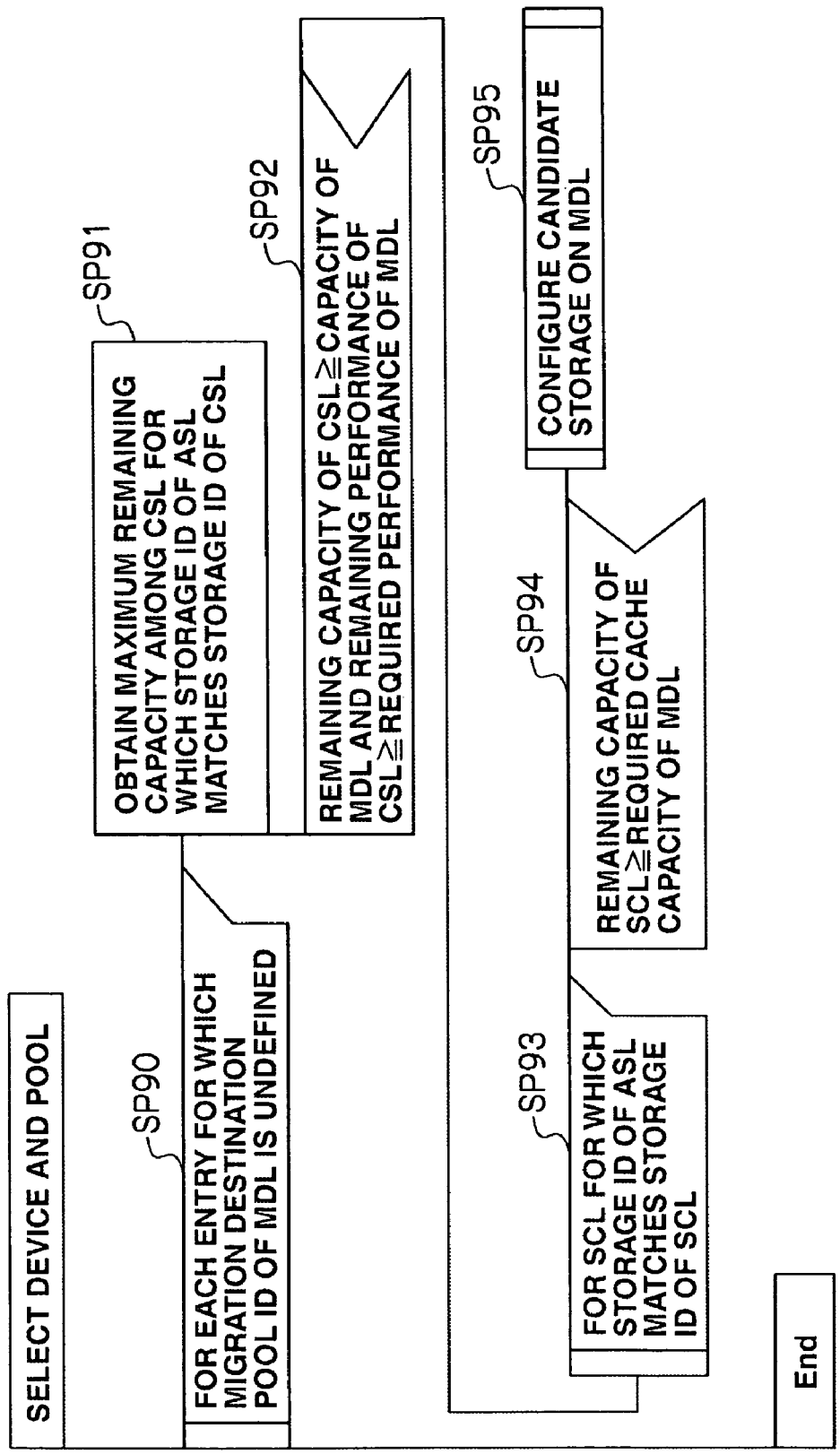
FIG. 21 is a PAD showing specific contents of processing performed by a CPU of a management server in step SP9 of application data migration processing.

FIG. 21 shows specific contents of processing performed by the CPU 40 in step SP9 of the application data migration processing. When the application data migration processing proceeds to step SP9, the CPU 40 performs the following processing on each of the entries for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58 (SP90).

In other words, the CPU 40 first searches among entries of the candidate storage pool list (CSL) 57 for an entry for which the same storage ID as the storage ID stored in the storage ID field 56E of any of the entries of the application storage assignment list (ASL) 56 is stored in the storage ID field 57B and whose remaining capacity stored in the remaining capacity field 57E is maximum (SP91).

When such an entry is retrieved, the CPU 40 judges whether the remaining capacity and the remaining performance of the corresponding storage pool 22 respectively stored in the remaining capacity field 57E and the remaining performance field 57F of the entry are both equal to or greater than the capacity and the required performance respectively stored in the capacity field 58E and the remaining performance field 58F of the then targeted entry of the migration data list (MDL) 58 (SP92).

When the judgment yields a positive result, the CPU 40 searches among entries of the storage cache list (SCL) 55 shown in FIG. 9 for an entry for which the same storage ID as the storage ID stored in the storage ID field 56E of the then targeted entry (the entry selected in step SP92) of the application storage assignment list (ASL) 56 is stored in the storage ID field 55A (SP93).

The CPU 40 then judges, with respect to the entry, whether the remaining capacity of the corresponding cache partition 34A stored in the remaining capacity field 55F is equal to or greater than the required cache capacity stored in the required cache capacity field 58G of the then targeted entry of the migration data list (MDL) 58 (SP94).

Thus, when the judgment yields a positive result, in the same manner as in step SP45 shown in FIG. 16, the CPU 40 sets the migration destination of application data corresponding to the then targeted entry of the migration data list 58 to the storage pool 22 corresponding to the entry of the migration data list (MDL) 58 (SP95).

Upon completing the processing of step SP91 to step SP95 on all entries for which a storage ID of a migration destination storage device 3, a pool ID of a migration destination storage pool 22 or a cache ID of a corresponding cache partition 34A is not stored in any of the storage ID field 58H, the pool ID field 58I and the cache ID field 58J on the migration data list (MDL) 58, the CPU 40 concludes the processing of step SP9 of the application data migration processing.

Figure 22:
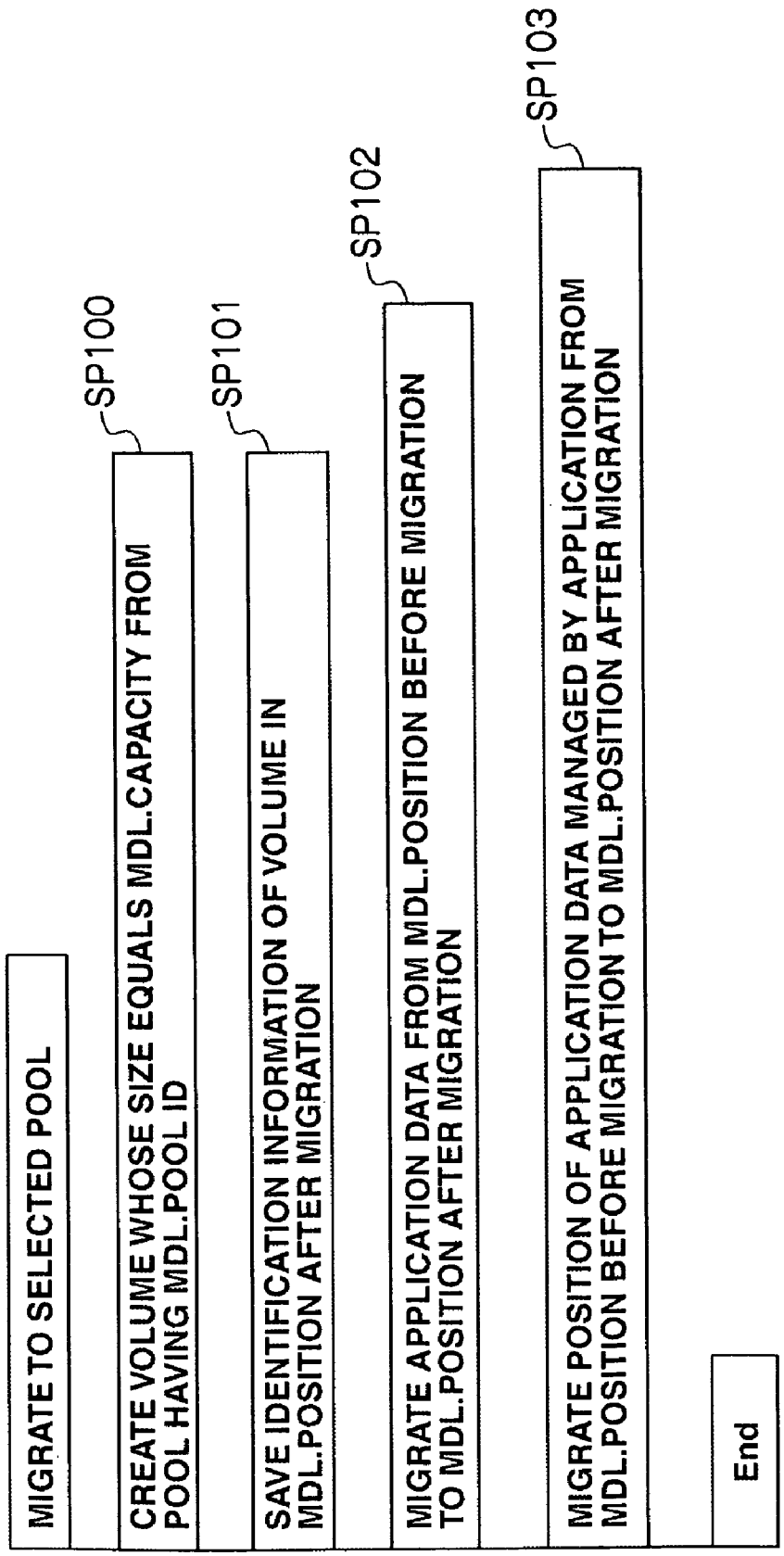
FIG. 22 is a PAD showing specific contents of processing performed by a CPU of a management server in step SP12 of application data migration processing.

FIG. 22 shows specific contents of processing performed by the CPU 40 in step SP12 of the application data migration processing. When the application data migration processing proceeds to step SP12, the CPU 40 performs the following processing on each of the entries for which a storage ID of a migration destination storage device 3, a pool ID of a migration destination storage pool 22 and a cache ID of a corresponding cache partition 34A are respectively stored in the storage ID field 58H, the pool ID field 58I and the cache ID field 58J on the migration data list (MDL) 58.

More specifically, the CPU 40 first controls a storage device 3 having a storage ID stored in the storage ID field 58H of the then targeted entry of the migration data list (MDL) 58, and creates a logical volume VOL whose size is the same as the capacity stored in the capacity field 58E of the entry on the storage pool 22 (FIG. 1) whose pool ID is stored in the pool ID field 58I of the entry (SP100).

The CPU 40 then stores the volume ID of the logical volume VOL created in step SP100 in the position after migration field 58L of the entry of the migration data list (MDL) 58 (SP101), and subsequently controls the application server 2 and the corresponding storage device 3 so as to migrate the application data corresponding to the entry from the original position stored in the position before migration field 58K of the migration data list (MDL) 58 to the logical volume VOL (SP102).

The CPU 40 then changes the position of the application data managed by the application from the position before migration stored in the position before migration field 58K of the migration data list (MDL) 58 to the position after migration stored in the position after migration field 58L of the migration data list (MDL) 58.

The CPU 40 performs the processing described above on each of the entries for which a storage ID of a migration destination storage device 3, a pool ID of a migration destination storage pool 22 and a cache ID of a corresponding cache partition 34A are respectively stored in the storage ID field 58H, the pool ID field 58I and the cache ID field 58J of the migration data list (MDL) 58. Upon completion of the processing, the CPU 40 concludes step SP12 of the application data migration processing.

(3) Advantages of the Present Embodiment

As described above, with the storage system 1 according to the present embodiment, since logical volumes VOL in the same storage device 3 are preferentially assigned when, to an application, a plurality of volumes VOL for storing application data to be used by the application are assigned, data used by the application can be stored consolidated in a minimum number of storage devices 3. Consequently, administration can be effectively prevented from becoming complex, and even when storage devices are suspended for maintenance, the number of affected applications can be reduced. As a result, a volume having a required performance can be assigned to an application while administration is simplified.

(4) Other Embodiments

While a case in which the present invention is applied to a storage system 1 configured as shown in FIG. 1 has been described for the embodiment presented above, the present invention is not limited to this storage system and can be widely applied to other storage systems having various configurations.

In addition, for the embodiment presented above, while a case has been described in which a management server 5 is configured as shown in FIG. 2 as an information processing apparatus that assigns a logical volume VOL provided on a storage pool 22 provided by a storage device 3 as a storage destination of application data used by an application running on an application server 2 connected to a plurality of storage devices 3 via a SAN 4, the present invention is not limited to this configuration and various other configurations can be widely applied.

Furthermore, for the embodiment presented above, while a case has been described in which both a management unit that manages a performance and a capacity of each storage pool 22 respectively provided by each storage device 3 and a performance and a capacity required for logical volumes VOL respectively assigned to each application and an assignment unit that assigns to an application a logical volume VOL having the performance and the capacity required by the application based on the performance and the capacity of each storage pool 22 and the performance and the capacity required for the logical volumes VOL to be respectively assigned to each application are configured by a CPU 40 of the management server 5 and a volume assignment unit 44 of the system management software 43, the present invention is not limited to this configuration and the functions of the management unit and the assignment unit may be configured by separate hardware or software.

Moreover, for the embodiment presented above, while a case has been described in which only logical volumes VOL in the same storage device 3 are preferentially assigned when, to an application, a plurality of logical volumes VOL for storing application data to be used by the application are assigned, the present invention is not limited to this arrangement. Instead, for example, randomly accessed data (for example, data contained in the database 63 shown in FIG. 3) and sequentially access data (for example, data contained in the log 64 shown in FIG. 3) among application data may be stored in separate logical volumes VOL at a migration destination, whereby a different cache partition 34A is assigned to the logical volumes VOL. Such an arrangement prevents data cached during random access from being deleted from the cache during sequential access and, in turn, avoids lowering of the cache hit ratio and improves accessibility from outside.

The present invention is applicable to a management server that manages a storage system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An information processing apparatus that assigns, to applications running on a host system connected to a plurality of storage devices via a network, at least one volume provided on a storage pool of storage areas, each storage device including at least one storage pool as a storage destination of data used by the applications, the information processing apparatus comprising:
   a management unit that manages a performance and a capacity of each storage pool, and a performance and a capacity required for the at least one volume to be respectively assigned to each application; and
   an assignment unit that assigns to each application, based on the performance and the capacity of each storage pool and the performance and the capacity required for the at least one volume to be respectively assigned to each application, a volume having the performance and the capacity required by the application,
wherein on a condition that the application requires assignment to a plurality of volumes, the assignment unit assigns a set of volumes in the same storage device.

2. The information processing apparatus according to claim 1, wherein the first storage areas are assemblies of storage areas provided by the plurality of physical disks constituting the same RAID (Redundant Array of Inexpensive Disks) group, and the assignment unit preferentially assigns, when assigning the plurality of volumes to one of the applications, volumes provided on the same first storage area in the same storage device.

3. The information processing apparatus according to claim 1, wherein the plurality of volumes to be assigned to the applications are volumes which respectively store different data constituting the same instance of the applications.

4. The information processing apparatus according to claim 3, wherein, when assigning the plurality of the volumes to one of the applications, after assigning the volumes provided in the same storage device, the assignment unit preferentially assigns volumes in the storage device which store data constituting a different instance of the same application.

5. An information processing method for assigning, to applications running on a host system connected to a plurality of storage devices via a network, at least one volume provided on a storage pool of storage areas, each storage device including at least one storage pool as a storage destination of data used by the applications, the information processing method comprising:
   a first step for managing a performance and a capacity of each storage pool, and a performance and a capacity required for the at least one volume to be respectively assigned to each application; and
   a second step for assigning to each application, based on the performance and the capacity of each storage pool and the performance and the capacity required for the at least one volume to be respectively assigned to each application, a volume having the performance and the capacity required by the application,
wherein in the second step, on a condition that the application requires assignment to a plurality of volumes, the assignment unit assigns a set of volumes in the same storage device.

6. The information processing method according to claim 5, wherein the first storage areas are assemblies of storage areas provided by a plurality of physical disks constituting the same RAID (Redundant Array of Inexpensive Disks) group, and in the second step, when the plurality of volumes are assigned to one of the applications, volumes provided on the same first storage area in the same storage device are preferentially assigned.

7. The information processing method according to claim 5, wherein the plurality of volumes to be assigned to the applications are volumes which respectively store different data constituting the same instance of the applications.

8. The information processing method according to claim 7, wherein in the second step, when the plurality of the volumes are assigned to one of the applications, after the volumes provided in the same storage device are assigned, volumes in the storage device which store data constituting a different instance of the same application are preferentially assigned.

* * * * *